US008852000B1

(12) United States Patent
Rhinesmith et al.

(10) Patent No.: US 8,852,000 B1
(45) Date of Patent: Oct. 7, 2014

(54) USING CROWD-SOURCING TO VERIFY THE ACCURACY OF RESULTS OF CLIENT-SIDE DETERMINATIONS

(75) Inventors: Justin Rhinesmith, Walnut Creek, CA (US); Michael Lin, Saratoga, CA (US)

(73) Assignee: Kabam, Inc., San Francisco, CA (US)

( * ) Notice: Subject to any disclaimer, the term of this patent is extended or adjusted under 35 U.S.C. 154(b) by 166 days.

(21) Appl. No.: 13/546,843

(22) Filed: Jul. 11, 2012

Related U.S. Application Data

(60) Provisional application No. 61/655,838, filed on Jun. 5, 2012.

(51) Int. Cl.
*A63F 9/24* (2006.01)
*G06F 15/16* (2006.01)

(52) U.S. Cl.
USPC ........... 463/42; 709/203; 709/201; 463/1; 463/7

(58) Field of Classification Search
None
See application file for complete search history.

(56) References Cited

U.S. PATENT DOCUMENTS

| | | | |
|---|---|---|---|
| 6,203,427 B1 * | 3/2001 | Walker et al. | 463/16 |
| 6,899,628 B2 | 5/2005 | Leen et al. | 463/42 |
| 7,169,050 B1 | 1/2007 | Tyler | 463/42 |
| 7,288,027 B2 | 10/2007 | Overton | 463/42 |
| 7,611,410 B2 | 11/2009 | Nakajima et al. | 463/29 |
| 7,792,960 B2 | 9/2010 | Goglin et al. | 709/224 |
| 7,988,545 B2 * | 8/2011 | Nakano et al. | 463/7 |
| 8,348,733 B2 * | 1/2013 | Kim et al. | 463/1 |
| 8,597,116 B2 * | 12/2013 | Nguyen et al. | 463/29 |
| 2006/0135258 A1 * | 6/2006 | Maheshwari et al. | 463/42 |

* cited by examiner

*Primary Examiner* — Wen-Tai Lin

(74) *Attorney, Agent, or Firm* — Pillsbury Winthrop Shaw Pittman LLP

(57) ABSTRACT

The accuracy of results of client-side determinations used for defining views of a virtual space may be verified via crowd-sourcing. Results of primary client-side determinations may be received from client computing platforms. Individual ones of the primary client-side determinations may be performed by individual client computing platforms presenting views of an instance of the virtual space to users. The results of the primary client-side determinations may form a basis for determining view information. The accuracy of the results of the primary client-side determinations may be verified by comparing the results of the primary client-side determinations with results of secondary client-side determinations performed by one or more client computing platforms. Individual ones of the secondary client-side determinations may simulate corresponding primary client-side determinations.

20 Claims, 2 Drawing Sheets

USING CROWD-SOURCING TO VERIFY THE ACCURACY OF RESULTS OF CLIENT-SIDE DETERMINATIONS

CROSS REFERENCE TO RELATED APPLICATIONS

The present application claims the priority benefit of U.S. provisional patent application Ser. No. 61/655,838, filed Jun. 5, 2012 and entitled "Using Crowd-Sourcing to Verify the Accuracy of Results of Client-Side Determinations", the disclosure of which is incorporated herein by reference.

FIELD OF THE DISCLOSURE

This disclosure relates to using crowd-sourcing to verify the accuracy of results of client-side determinations, such as those used for defining views of a virtual space.

BACKGROUND

Some existing online games may rely on client-side technologies that are difficult or impossible to secure for user-facing game components. As a result, determinations performed by those clients may not be trustworthy. Verifying such determinations at a server may limit interactivity and/or responsiveness of existing online games.

SUMMARY

One aspect of the disclosure relates to a system configured to verify the accuracy of results of client-side determinations used for defining views of a virtual space, in accordance with one or more implementations. In exemplary implementations, complex determinations and real-time interactions may be performed reliably by client computing platforms without having to duplicate those determinations on a server. For virtual spaces involving with unsecured client computing platforms (e.g., browser-based games based on Flash technologies), implementations of the present invention may reduce and/or eliminate vulnerability to user tampering such as data manipulation, memory modification, data interception, and/or other tampering methods. Exemplary implementations may detect user tampering in client computing platforms by verifying determination results under question against a crowd-sourced quorum of other client computing platforms that simulate those determination results. In some implementations, the system may include one or more servers. The server(s) may be configured to communicate with one or more client computing platforms according to a client/server architecture. The users may access the system and/or the virtual space via the client computing platforms.

The server(s) may be configured to execute one or more computer program modules. The computer program modules may include one or more of a users module, a space module, a client-side determination provisioning module, a client-side determination receipt module, a client-side determination verification module, and/or other modules. The user module may be configured to access and/or manage one or more user profiles and/or user information associated with users of the system. The space module may be configured to implement the instance of the virtual space executed by the computer modules to determine views of the virtual space. The views may then be communicated (e.g., via streaming, via object/position data, and/or other information) from server(s) to the client computing platforms for presentation to users.

The client-side determination provisioning module may be configured to transmit determination information to individual client computing platforms. The determination information may be configured to facilitate primary determinations performed by individual client computing platforms presenting views of the instance of the virtual space to users. According to various implementations, the determination information for a given primary client-side determination may include starting parameters, and/or other information configured to facilitate the given primary client-side determination. Examples of determinations performed by the client computing platforms may include determining outcomes of scenarios (e.g., battles), and/or other determinations.

In some implementations, the determination information for the given primary client-side determination may include a token, and/or other information configured to facilitate hashing and/or encryption. Accordingly, the client-side determination provisioning module may be configured to hash the determination information to the token, and/or to encrypt the determination information. The hashed and/or encrypted determination information may be stored by the server(s). In some implementations, a token and/or other information included in the determination information may facilitate confirming a given client computing platform is eligible to perform an action corresponding to a given primary determination.

The client-side determination provisioning module may be configured to transmit determination information to individual client computing platforms other than those that performed the primary determination. Here, the determination information may be configured to facilitate performing secondary determinations that correspond to the primary determinations. A given secondary determination may correspond to a given primary determination if the given secondary determination attempts to simulate, duplicate, mirror, and/or otherwise achieve the same result as the given primary determination.

The client-side determination provisioning module may be configured to select a number of client computing platforms to send the determination information to. Individual ones of those client computing platforms may each be assigned a unique ticket and/or other identifier, which may enforce that the client computing platforms selected to validate a given primary client-side determination are random.

The client-side determination receipt module may be configured to receive results of primary client-side determinations and/or secondary client-side determinations from one or more client computing platforms. The results may include outcomes of scenarios (e.g., battles), and/or other determination results. In some implementations, the results of primary client-side determinations may form a basis for view information determined by the space module. The results of a given primary client-side determination may include external inputs (e.g., user actions performed via client computing platforms) stored in an events script. The results of the given primary client-side determination may include a token transmitted by the client-side determination provisioning module as part of the corresponding determination information.

According to some implementations, the client-side determination receipt module may be configured to reject results of a given secondary client-side determination responsive to those results failing to be submitted with a valid ticket and/or other identifier from a given client computing platform. This may prevent collusion between users aiming to cheat in the system. This may also prevent disruptions in the system caused by large quantities of invalid determination results flooding the system.

The client-side determination verification module may be configured to verify the accuracy of the results of the primary client-side determinations. In some implementations, the accuracy of the results of the primary client-side determinations may be verified by comparing the results of the primary client-side determinations with results of secondary client-side determinations performed by other client computing platforms. Comparing the results of the primary client-side determinations with results of secondary client-side determinations performed by other client computing platforms may include determining whether the results of the primary client-side determinations are the same as and/or substantially similar to the results of secondary client-side determinations. In some implementations, a first result of a primary determination performed by a given client computing platform may be verified responsive to the first result agreeing with a threshold quantity of results of corresponding secondary client-side determinations performed by other client computing platforms. The threshold quantity of results of corresponding secondary client-side determinations equals half (or any other quantity) of the number of client computing platforms performing the corresponding secondary client-side determinations.

The client-side determination verification module may be configured to add received results of primary client-side determinations to a queue for subsequent verification. The results of primary client-side determinations in the queue may be selected sequentially, randomly, and/or in some other order, and/or not selected at all, for verification by the client-side determination verification module, in accordance with various implementations.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
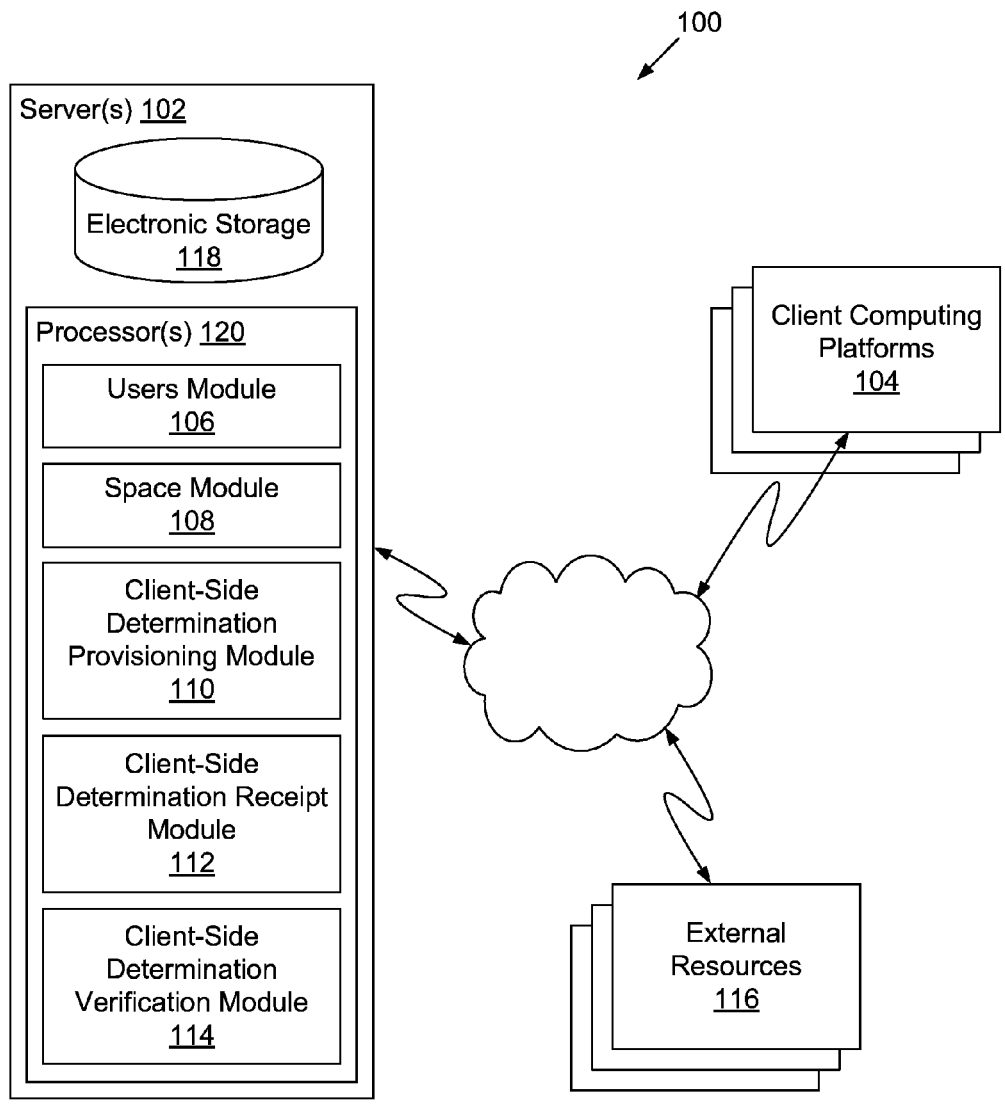
FIG. 1 illustrates a system configured to verify the accuracy of results of client-side determinations used for defining views of a virtual space, in accordance with one or more implementations.

FIG. 1 illustrates a system 100 configured to verify the accuracy of results of client-side determinations used for defining views of a virtual space, in accordance with one or more implementations. In exemplary implementations, complex determinations and real-time interactions may be performed reliably by client computing platforms without having to duplicate those determinations on a server. For virtual spaces involving with unsecured client computing platforms (e.g., browser-based games based on Flash technologies), implementations of the present invention may reduce and/or eliminate vulnerability to user tampering such as data manipulation, memory modification, data interception, and/or other tampering methods. Exemplary implementations may detect user tampering in client computing platforms by verifying determination results under question against a crowd-sourced quorum of other client computing platforms that simulate those determination results. In some implementations, system 100 may include one or more servers 102. The server(s) 102 may be configured to communicate with one or more client computing platforms 104 according to a client/server architecture. The users may access system 100 and/or the virtual space via client computing platforms 104.

The server(s) 102 may be configured to execute one or more computer program modules. The computer program modules may include one or more of a users module 106, a space module 108, a client-side determination provisioning module 110, a client-side determination receipt module 112, a client-side determination verification module 114, and/or other modules.

The user module 106 may be configured to access and/or manage one or more user profiles and/or user information associated with users of the system 100. The one or more user profiles and/or user information may include information stored by server(s) 102, one or more of the client computing platforms 104, and/or other storage locations. The user profiles may include, for example, information identifying users (e.g., a username or handle, a number, an identifier, and/or other identifying information) within the virtual space, security login information (e.g., a login code or password), virtual space account information, subscription information, virtual currency account information (e.g., related to currency held in credit for a user), relationship information (e.g., information related to relationships between users in the virtual space), virtual space usage information, demographic information associated with users, interaction history among users in the virtual space, information stated by users, purchase information of users, browsing history of users, a client computing platform identification associated with a user, a phone number associated with a user, and/or other information related to users.

The space module 108 may be configured to implement the instance of the virtual space executed by the computer modules to determine views of the virtual space. The views may then be communicated (e.g., via streaming, via object/position data, and/or other information) from server(s) 102 to client computing platforms 104 for presentation to users. The view determined and transmitted to a given client computing platform 104 may correspond to a user character being controlled by a user via the given client computing platform 104. The view determined and transmitted to a given client computing platform 104 may correspond to a location in the virtual space (e.g., the location from which the view is taken, the location the view depicts, and/or other locations), a zoom ratio, a dimensionality of objects, a point-of-view, and/or view parameters. One or more of the view parameters may be selectable by the user.

The instance of the virtual space may comprise a simulated space that is accessible by users via clients (e.g., client computing platforms 104) that present the views of the virtual space to a user. The simulated space may have a topography, express ongoing real-time interaction by one or more users, and/or include one or more objects positioned within the topography that are capable of locomotion within the topography. In some instances, the topography may be a 2-dimensional topography. In other instances, the topography may be a 3-dimensional topography. The topography may include dimensions of the space, and/or surface features of a surface or objects that are "native" to the space. In some instances, the topography may describe a surface (e.g., a ground surface) that runs through at least a substantial portion of the space. In some instances, the topography may describe a volume with one or more bodies positioned therein (e.g., a simulation of gravity-deprived space with one or more celestial bodies positioned therein). The instance executed by the computer modules may be synchronous, asynchronous, and/or semi-synchronous.

The above description of the manner in which views of the virtual space are determined by space module 108 is not intended to be limiting. The space module 108 may be configured to express the virtual space in a more limited, or more rich, manner. For example, views determined for the virtual space may be selected from a limited set of graphics depicting an event in a given place within the virtual space. The views may include additional content (e.g., text, audio, pre-stored video content, and/or other content) that describes particulars of the current state of the place, beyond the relatively generic graphics. For example, a view may include a generic battle graphic with a textual description of the opponents to be confronted. Other expressions of individual places within the virtual space are contemplated.

Within the instance(s) of the virtual space executed by space module 108, users may control characters, objects, simulated physical phenomena (e.g., wind, rain, earthquakes, and/or other phenomena), and/or other elements within the virtual space to interact with the virtual space and/or each other. The user characters may include avatars. As used herein, the term "user character" may refer to an object (or group of objects) present in the virtual space that represents an individual user. The user character may be controlled by the user with which it is associated. The user controlled element(s) may move through and interact with the virtual space (e.g., non-user characters in the virtual space, other objects in the virtual space). The user controlled elements controlled by and/or associated with a given user may be created and/or customized by the given user. The user may have an "inventory" of virtual goods and/or currency that the user can use (e.g., by manipulation of a user character or other user controlled element, and/or other items) within the virtual space.

The users may participate in the instance of the virtual space by controlling one or more of the available user controlled elements in the virtual space. Control may be exercised through control inputs and/or commands input by the users through client computing platforms 104. The users may interact with each other through communications exchanged within the virtual space. Such communications may include one or more of textual chat, instant messages, private messages, voice communications, and/or other communications. Communications may be received and entered by the users via their respective client computing platforms 104. Communications may be routed to and from the appropriate users through server(s) 102 (e.g., through space module 108).

The client-side determination provisioning module 110 may be configured to transmit determination information to individual client computing platforms 104. The determination information may be configured to facilitate primary determinations performed by individual client computing platforms 104 presenting views of the instance of the virtual space to users. According to various implementations, the determination information for a given primary client-side determination may include starting parameters, and/or other information configured to facilitate the given primary client-side determination. Examples of determinations performed by client computing platforms 104 may include determining outcomes of scenarios (e.g., battles), and/or other determinations.

In some implementations, the determination information for the given primary client-side determination may include a token, and/or other information configured to facilitate hashing and/or encryption. Accordingly, the client-side determination provisioning module 110 may be configured to hash the determination information to the token, and/or to encrypt the determination information. The hashed and/or encrypted determination information may be stored by server(s) 102. In some implementations, a token and/or other information included in the determination information may facilitate confirming a given client computing platform 104 is eligible to perform an action corresponding to a given primary determination.

The client-side determination provisioning module 110 may be configured to transmit determination information to individual client computing platforms 104 other than those that performed the primary determination. Here, the determination information may be configured to facilitate performing secondary determinations that correspond to the primary determinations. A given secondary determination may correspond to a given primary determination if the given secondary determination attempts to simulate, duplicate, mirror, and/or otherwise achieve the same result as the given primary determination.

The client-side determination provisioning module 110 may be configured to select a number of client computing platforms 104 to send the determination information to. Individual ones of those client computing platforms 104 may each be assigned a unique ticket and/or other identifier, which may enforce that the client computing platforms 104 selected to validate a given primary client-side determination are random.

The client-side determination receipt module 112 may be configured to receive results of primary client-side determinations and/or secondary client-side determinations from one or more client computing platforms 104. The results may include outcomes of scenarios (e.g., battles), and/or other determination results. In some implementations, the results of primary client-side determinations may form a basis for view information determined by space module 108. The results of a given primary client-side determination may include external inputs (e.g., user actions performed via client computing platforms 104) stored in an events script. The results of the given primary client-side determination may include a token transmitted by client-side determination provisioning module 110 as part of the corresponding determination information.

According to some implementations, client-side determination receipt module 112 may be configured to reject results of a given secondary client-side determination responsive to those results failing to be submitted with a valid ticket and/or other identifier from a given client computing platform 104. This may prevent collusion between users aiming to cheat in system 100. This may also prevent disruptions in system 100 caused by large quantities of invalid determination results flooding system 100.

The client-side determination verification module 114 may be configured to verify the accuracy of the results of the primary client-side determinations. In some implementations, the accuracy of the results of the primary client-side determinations may be verified by comparing the results of the primary client-side determinations with results of secondary client-side determinations performed by other client computing platforms 104. Comparing the results of the primary client-side determinations with results of secondary client-side determinations performed by other client computing platforms 104 may include determining whether the results of the primary client-side determinations are the same as and/or substantially similar to the results of secondary client-side determinations. In some implementations, a first result of a primary determination performed by a given client computing platform 104 may be verified responsive to the first result agreeing with a threshold quantity of results of corresponding secondary client-side determinations performed by other client computing platforms 104. The threshold quantity of results of corresponding secondary client-side determinations equals half (or any other quantity) of the number of client computing platforms 104 performing the corresponding secondary client-side determinations.

The client-side determination verification module 114 may be configured to add received results of primary client-side determinations to a queue for subsequent verification. The results of primary client-side determinations in the queue may be selected sequentially, randomly, and/or in some other order, and/or not selected at all, for verification by client-side determination verification module 114, in accordance with various implementations.

Verifications obtained via client-side determination verification module 114 may be aggregated. The server(s) 102 and/or administrators may determine a course of action based on the aggregated verifications. In some implementations, a given client computing platform 104 found to be cheating may be excluded from system 100.

In some implementations, server(s) 102, client computing platforms 104, and/or external resources 116 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which server(s) 102, client computing platforms 104, and/or external resources 116 may be operatively linked via some other communication media.

A given client computing platform 104 may include one or more processors configured to execute computer program modules. The computer program modules may be configured to enable an expert or user associated with the given client computing platform 104 to interface with system 100 and/or external resources 116, and/or provide other functionality attributed herein to client computing platforms 104. By way of non-limiting example, the given client computing platform 104 may include one or more of a desktop computer, a laptop computer, a handheld computer, a NetBook, a Smartphone, a gaming console, and/or other computing platforms.

The external resources 116 may include sources of information, hosts and/or providers of virtual spaces outside of system 100, external entities participating with system 100, and/or other resources. In some implementations, some or all of the functionality attributed herein to external resources 116 may be provided by resources included in system 100.

The server(s) 102 may include electronic storage 118, one or more processor(s) 120, and/or other components. The server(s) 102 may include communication lines, or ports to enable the exchange of information with a network and/or other computing platforms. Illustration of server(s) 102 in FIG. 1 is not intended to be limiting. The server(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 118 may comprise electronic storage media that electronically stores information. The electronic storage media of electronic storage 118 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 118 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage 118 may include one or more virtual storage resources (e.g., cloud storage, a virtual private network, and/or other virtual storage resources). Electronic storage 118 may store software algorithms, information determined by processor(s) 120, information received from server(s) 102, information received from client computing platforms 104, and/or other information that enables server(s) 102 to function as described herein.

Processor(s) 120 is configured to provide information processing capabilities in server(s) 102. As such, processor(s) 120 may include one or more of a digital processor, an analog processor, a digital circuit designed to process information, an analog circuit designed to process information, a state machine, and/or other mechanisms for electronically processing information. Although processor(s) 120 is shown in FIG. 1 as a single entity, this is for illustrative purposes only. In some implementations, processor(s) 120 may include a plurality of processing units. These processing units may be physically located within the same device, or processor(s) 120 may represent processing functionality of a plurality of devices operating in coordination. The processor(s) 120 may be configured to execute modules 106, 108, 110, 112, 114, and/or other modules. The processor(s) 120 may be configured to execute modules 106, 108, 110, 112, 114, and/or other modules by software; hardware; firmware; some combination of software, hardware, and/or firmware; and/or other mechanisms for configuring processing capabilities on processor(s) 120.

It should be appreciated that although modules 106, 108, 110, 112, and 114 are illustrated in FIG. 1 as being co-located within a single processing unit, in implementations in which processor(s) 120 includes multiple processing units, one or more of modules 106, 108, 110, 112, and/or 114 may be located remotely from the other modules. The description of the functionality provided by the different modules 106, 108, 110, 112, and/or 114 described below is for illustrative purposes, and is not intended to be limiting, as any of modules 106, 108, 110, 112, and/or 114 may provide more or less functionality than is described. For example, one or more of modules 106, 108, 110, 112, and/or 114 may be eliminated, and some or all of its functionality may be provided by other ones of modules 106, 108, 110, 112, and/or 114. As another example, processor(s) 120 may be configured to execute one or more additional modules that may perform some or all of the functionality attributed below to one of modules 106, 108, 110, 112, and/or 114.

Figure 2:
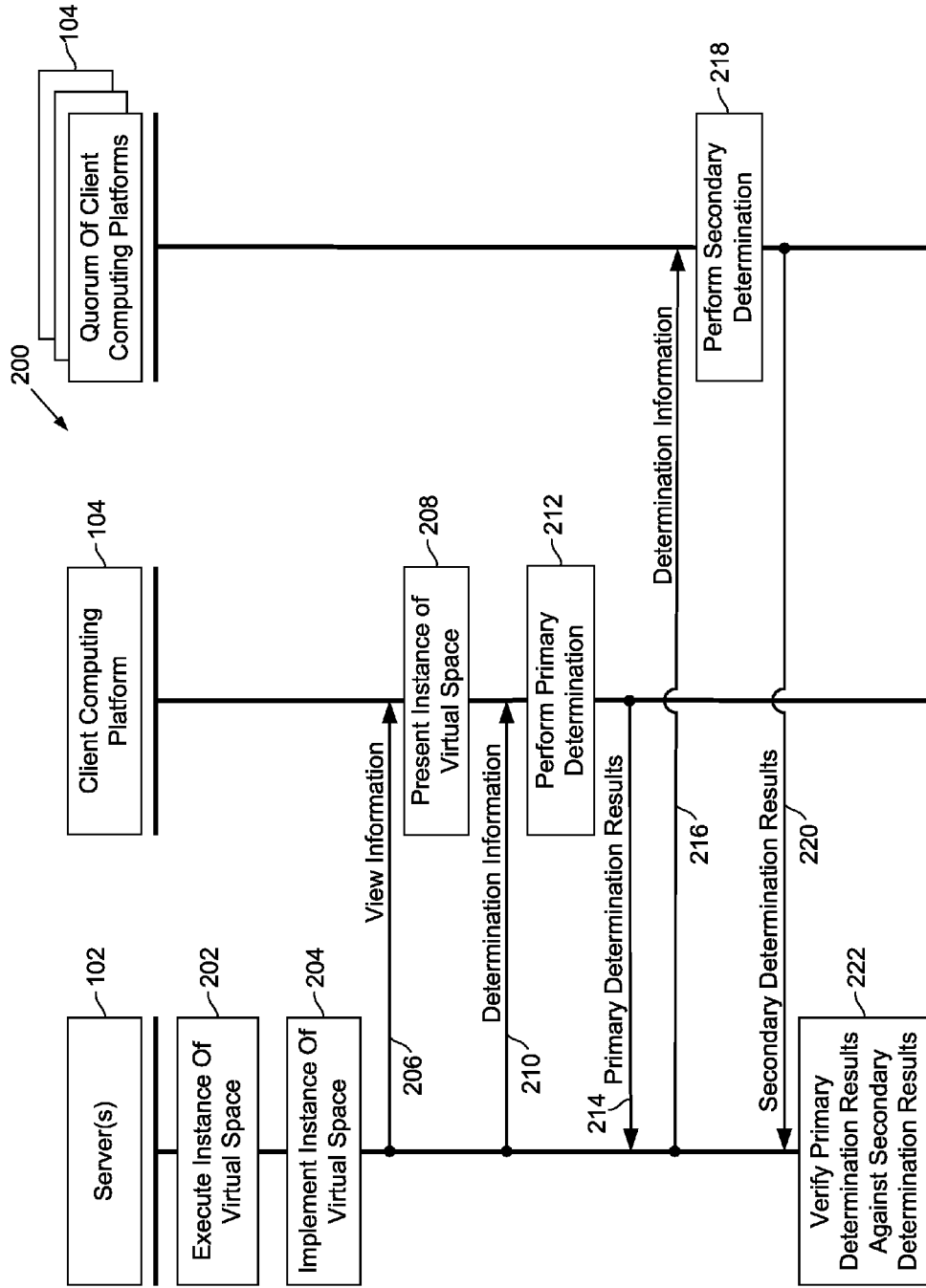
FIG. 2 illustrates a method for verifying the accuracy of results of client-side determinations used for defining views of a virtual space, in accordance with one or more implementations.

FIG. 2 illustrates a method 200 for verifying the accuracy of results of client-side determinations used for defining views of a virtual space, in accordance with one or more implementations. The operations of method 200 presented below are intended to be illustrative. In some embodiments, method 200 may be accomplished with one or more additional operations not described, and/or without one or more of the operations discussed. Additionally, the order in which the operations of method 200 are illustrated in FIG. 2 and described below is not intended to be limiting.

In some embodiments, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

At an operation 202, an instance of a virtual space may be executed. Operation 202 may be performed by a space module that is the same as or similar to space module 108, in accordance with one or more implementations.

At an operation 204, the instance of the virtual space may be implemented to determine view information defining views of the instance of the virtual space for presentation to users. Operation 204 may be performed by a space module that is the same as or similar to space module 108, in accordance with one or more implementations.

At an operation 206, view information may be transmitted from server(s) 102 to a given client computing platform 104. Operation 206 may be performed by a space module that is the same as or similar to space module 108, in accordance with one or more implementations.

At an operation 208, the given client computing platform 104 may present the instance of the virtual space to a corresponding user. Operation 208 may be performed by individual ones of client computing platforms 104, in accordance with one or more implementations.

At an operation 210, determination information may be transmitted from server(s) 102 to the given client computing platform 104. Operation 210 may be performed by a client-side determination provisioning module that is the same as or similar to client-side determination provisioning module 110, in accordance with one or more implementations.

At an operation 212, the given client computing platform 104 may perform a primary determination, which may be based on the determination information received at operation 210. Operation 212 may be performed by individual ones of client computing platforms 104, in accordance with one or more implementations.

At an operation 214, results of the primary client-side determination may be received by server(s) 102 from the given client computing platform 104. Operation 214 may be performed by a client-side determination receipt module that is the same as or similar to client-side determination receipt module 112, in accordance with one or more implementations.

At an operation 216, determination information may be transmitted from server(s) 102 to a quorum of one or more client computing platforms 104. Operation 216 may be performed by a client-side determination provisioning module that is the same as or similar to client-side determination provisioning module 110, in accordance with one or more implementations.

At an operation 218, individual ones of the quorum of client computing platforms 104 may perform secondary determinations, which may be based on the determination information received at operation 216. Operation 218 may be performed by individual ones of client computing platforms 104, in accordance with one or more implementations.

At an operation 220, results of the secondary client-side determinations may be received by server(s) 102 from the quorum of client computing platforms 104. Operation 220 may be performed by a client-side determination receipt module that is the same as or similar to client-side determination receipt module 112, in accordance with one or more implementations.

At an operation 222, the accuracy of the results of the primary client-side determination may be verified against the results of secondary client-side determinations. Operation 222 may be performed by a client-side determination verification module that is the same as or similar to client-side determination verification module 114, in accordance with one or more implementations.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system configured to verify the accuracy of results of client-side determinations used for defining views of a virtual space, the system comprising:
   one or more processors configured to execute computer program modules, the computer program modules comprising:
   a client-side determination receipt module configured to receive results of primary client-side determinations of game outcomes in a game from one or more client computing platforms including a first client computing platform, individual ones of the primary client-side determinations of the game outcomes being performed by individual client computing platforms presenting views of the instance of the virtual space, in which game is played, to users, the game outcomes of the primary client-side determinations forming a basis for determining view information of the virtual space; and
   a client-side determination verification module configured to verify the accuracy of the game outcomes of the primary client-side determinations by comparing the game outcomes of the primary client-side determinations with game outcomes of secondary client-side determinations performed by one or more client computing platforms, individual ones of the secondary client-side determinations simulating corresponding primary client-side determinations of the game outcomes, wherein a first game outcome of a primary determination performed by the first client computing platform is verified as accurate responsive to the first game outcome corresponding with at least a threshold quantity of game outcomes of corresponding secondary client-side determinations of the game outcome performed by other client computing platforms.

2. The system of claim 1, wherein the threshold quantity of game outcomes of corresponding secondary client-side determinations equals half of the number of client computing platforms performing the corresponding secondary client-side determinations of the game outcomes, where individual ones of the client computing platforms performing the corresponding secondary client side determinations perform a single secondary client side determination of the game outcome.

3. The system of claim 1, further comprising a client-side determination provisioning module configured to transmit determination information to individual client computing platforms, the determination information being configured to facilitate primary determinations performed by individual client computing platforms presenting views of the instance of the virtual space to users.

4. The system of claim 3, wherein the determination information for a given primary client-side determination includes starting parameters for the given primary client-side determination.

5. The system of claim 4, wherein the determination information for the given primary client-side determination includes a token.

6. The system of claim 5, wherein the determination provisioning module is further configured to hash the starting parameters for the given primary client-side determination to the token, and to store the hashed starting parameters.

7. The system of claim 5, wherein the first game outcome includes a first token.

8. The system of claim 3, wherein the client-side determination provisioning module is further configured to transmit determination information to individual ones of the other client computing platforms, the determination information being configured to facilitate corresponding secondary determinations performed by individual ones of the other client computing platforms.

9. The system of claim 1, wherein the client-side determination receipt module is further configured to receive game outcomes of secondary client-side determinations from the other client computing platforms.

10. The system of claim 1, wherein the client-side determination verification module is further configured to add received game outcomes of primary client-side determinations to a queue for subsequent verification.

11. A method for verifying the accuracy of results of client-side determinations used for defining views of a virtual space, the method being implemented in a computer system comprising one or more processors configured to execute computer program modules, the method comprising:

receiving results of primary client-side determinations of game outcomes in a game from one or more client computing platforms including a first client computing platform, individual ones of the primary client-side determinations of the game outcomes being performed by individual client computing platforms presenting views of the instance of the virtual space, in which the game is played, to users, the game outcomes of the primary client-side determinations forming a basis for determining view information of the virtual space; and, verifying the accuracy of the game outcomes of the primary client-side determinations by comparing the game outcomes of the primary client-side determinations with game outcomes of secondary client-side determinations performed by one or more client computing platforms, individual ones of the secondary client-side determinations simulating corresponding primary client-side determinations of the game outcomes, wherein a first game outcome of a primary determination performed by the first client computing platform is verified as accurate responsive to the first game outcome corresponding with at least a threshold quantity of game outcomes of corresponding secondary client-side determinations performed by other client computing platforms.

12. The method of claim 11, wherein the threshold quantity of game outcomes of corresponding secondary client-side determinations equals half of the number of client computing platforms performing the corresponding secondary client-side determinations of the game outcomes, where individual ones of the client computing platforms performing the corresponding secondary client side determinations perform a single secondary client side determination of the game outcome.

13. The method of claim 11, further comprising transmitting determination information to individual client computing platforms, the determination information being configured to facilitate primary determinations performed by individual client computing platforms presenting views of the instance of the virtual space to users.

14. The method of claim 13, wherein the determination information for a given primary client-side determination includes starting parameters for the given primary client-side determination.

15. The method of claim 14, wherein the determination information for the given primary client-side determination includes a token.

16. The method of claim 15, further comprising:
hashing the starting parameters for the given primary client-side determination to the token; and
storing the hashed starting parameters.

17. The method of claim 15, wherein the first game outcome includes a first token.

18. The method of claim 13, further comprising transmitting determination information to individual ones of the other client computing platforms, the determination information being configured to facilitate corresponding secondary determinations performed by individual ones of the other client computing platforms.

19. The method of claim 11, further comprising receiving game outcomes of secondary client-side determinations from the other client computing platforms.

20. The method of claim 11, further comprising adding received game outcomes of primary client-side determination to a queue for subsequent verification.

* * * * *